April 8, 1924.

C. CARSON 1,489,697

HEADLIGHT LENS

Filed March 15, 1922    2 Sheets-Sheet 1

INVENTOR
Clarence Carson
Newell and Spencer
ATTORNEYS

April 8, 1924.
C. CARSON
1,489,697
HEADLIGHT LENS
Filed March 15, 1922    2 Sheets-Sheet 2
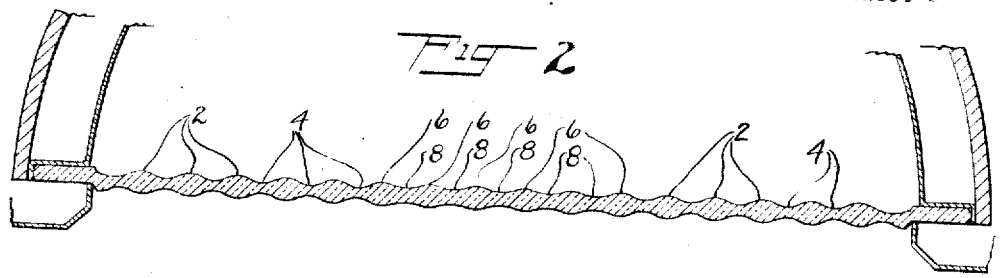
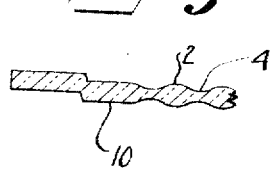
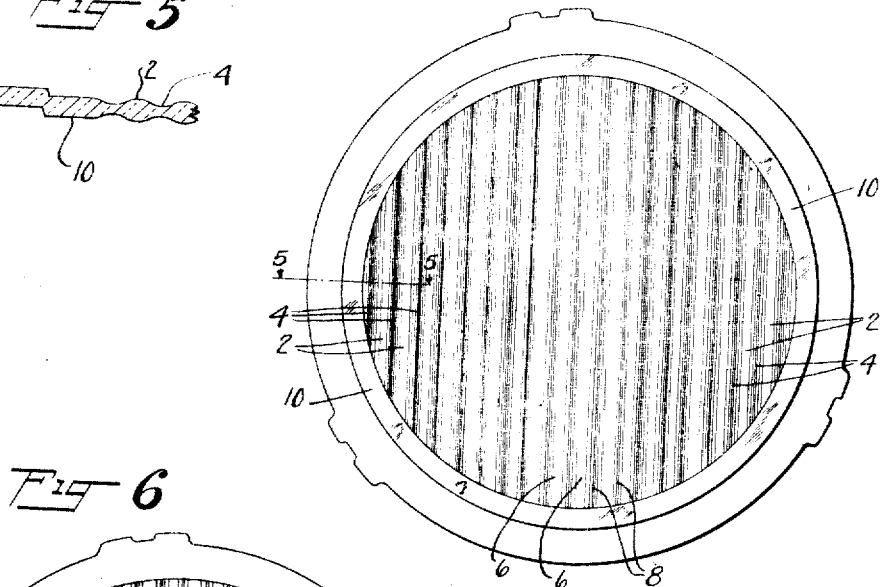
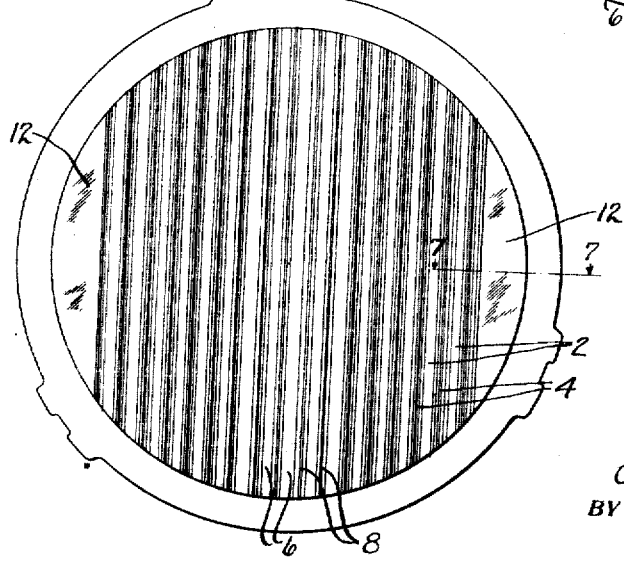
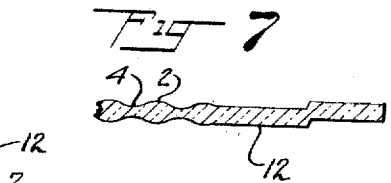
INVENTOR
Clarence Carson
BY Newell and Spencer
ATTORNEYS Patented Apr. 8, 1924.

1,489,697

UNITED STATES PATENT OFFICE.

CLARENCE CARSON, OF NEW ROCHELLE, NEW YORK, ASSIGNOR TO DODGE BROTHERS, OF DETROIT, MICHIGAN, A CORPORATION OF MICHIGAN.

HEADLIGHT LENS.

Application filed March 15, 1922. Serial No. 543,833.

*To all whom it may concern:*

Be it known that I, CLARENCE CARSON, a citizen of the United States, residing at New Rochelle, N. Y., have invented certain new and useful Improvements in Headlight Lens, of which the following is a clear, full, and exact description.

This invention relates to headlight lenses and particularly to lenses for headlights of the type having the usual parabolic reflector and having the lamp located substantially at the focus of the reflector, and a general object of the invention is to provide a lens which will comply with the laws and regulations of the various States governing the glare, illuminating effect, elevation of beam, etc. of headlights.

A particular object of the invention is so to construct the lens that while a proper and sufficient illumination will be provided for the sides of the road, a larger proportion of the light from the lamp will be directed to proper illumination of the road ahead than is utilized with many lenses now on the market which are designed to comply with the laws and regulations of the various States.

The invention aims also to provide a lens of such simple construction that it may be easily and inexpensively molded and that the dies for molding the lens may be made at relatively small cost.

Other objects and important features of the invention will appear from the following description and claims when considered in connection with the accompanying drawings, in which Fig. 1 is a front elevation of a lens embodying the present invention;

Fig. 2 is a transverse section through the lens shown in Fig. 1;

Fig. 4 shows a modification of the lens;

Fig. 5 is a detail section on the line 5—5 of Fig. 4;

Fig. 6 is a view showing another modification of the lens; and

Fig. 7 is a detail section on the line 7—7 of Fig. 6.

As hereinabove suggested, the lens which is the subject-matter of the present invention is designed for use with the usual headlight, comprising a parabolic reflector and a lamp located at the focus of the reflector so that a beam of substantially parallel rays would be projected were it not for the interposition of the lens.

In order to meet the laws and regulations of the various States of the United States, it is important that there be a sufficient quantity of light thrown to the sides of the road to illuminate pedestrians and others who may be traveling or standing close to the path of the vehicle and at a relatively short distance ahead of the vehicle. It is further important that the headlight throw a sufficient quantity of light directly ahead of the vehicle to effectively illuminate the road for a considerable distance ahead of the vehicle, this distance being sufficient to provide the proper illumination for driving at relatively high speed at night. It is also further important that the light be so directed and controlled that it will not throw a blinding glare in the eyes of the driver of a vehicle going in the opposite direction. Each of these objects is fully attained by the lens of the present invention.

Figure 1:
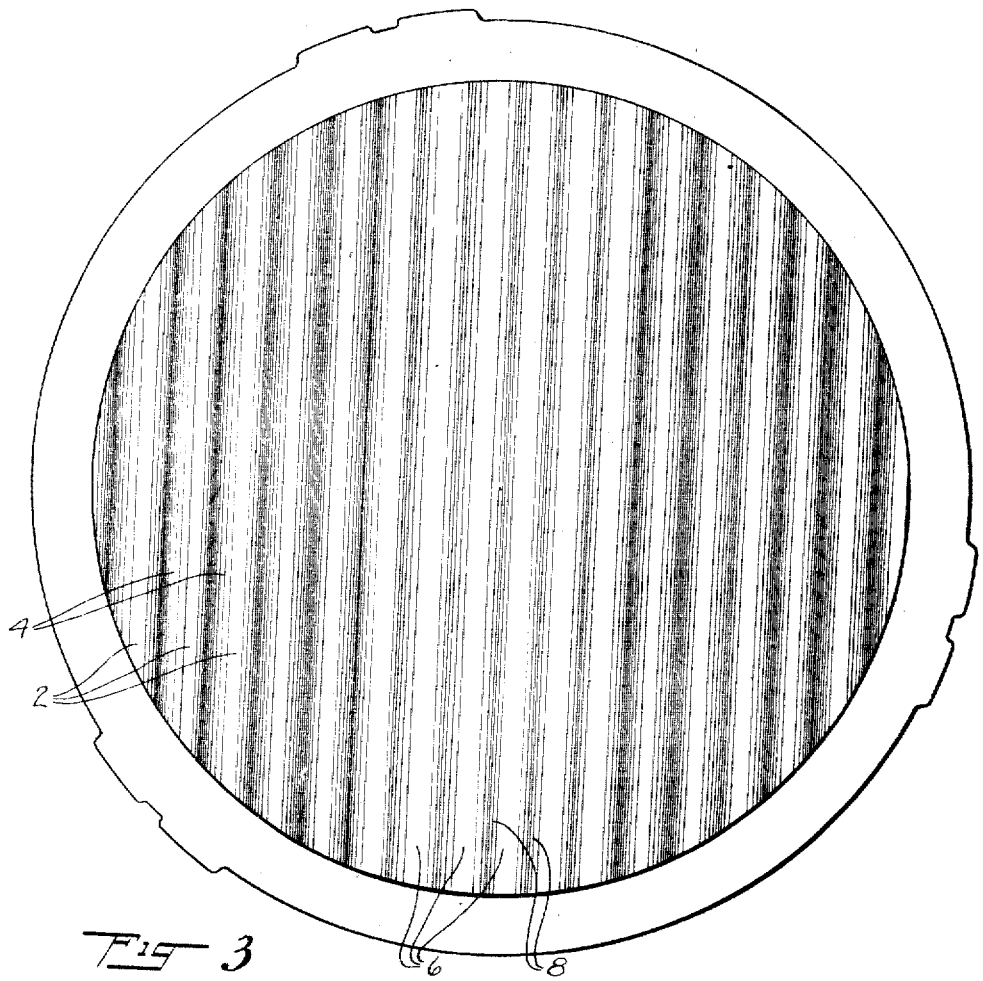

In the form of the invention illustrated in Fig. 1 of the drawings, the lens is provided throughout its exposed area and preferably upon both faces with vertically arranged ribs and grooves or ribs and valleys, these ribs and valleys being of curved contour in cross section, the combined cross section presenting a substantially sinuous contour on each face, and each of the ribs and valleys being of substantially the same cross sectional contour from one end to the other. In the lens illustrated in Fig. 1, there are three groups of these ribs and valleys, two lateral groups in which all of the ribs 2 are of the same height and preferably of the same width and in which all of the valleys 4 are of the same depth and preferably also of the same width, the valleys being preferably also of the same width as the ribs, and an intermediate group in which the ribs 6 are of less height than the ribs 2 and have a transverse curvature upon an arc of greater radius than that of the transverse curvature of the ribs 2, the valleys 8 of the intermediate group being also shallower than the valleys 4 and curved in transverse section upon an arc of greater radius than that of the transverse section of the valleys 4. The ribs 6 and valleys 8 are preferably also of equal width, this width being preferably the same as that of the ribs 2 and valleys 4.

With a lens of the foregoing construction, the two lateral groups of ribs effect a lateral spreading of the light sufficient to illuminate people and objects at the side of the road, the ribs and valleys of these two groups of course permitting a portion of the rays of light to pass directly through them. The intermediate group of ribs and valleys being curved upon arcs of greater radius do not bend the rays of light as much as the ribs of the lateral groups and consequently transmit a much larger proportion of the rays directly ahead of the headlight. There is, however, a sufficient diffusion of the light to prevent glare from that part of the beam that passes through this part of the lens.

Figure 3:
Fig. 3 is a diagrammatic view illustrating the outline of the beam of light produced by the lens when projected upon a vertical surface.

The general shape of the beam as projected against a vertical surface is shown in Fig. 3. From this figure it will be noted that the principal lighting effect is directly ahead of the vehicle and that only sufficient light is thrown laterally to clearly define the limits of the road and objects and persons at the side of the road. In employing a lens of this construction, the headlight is preferably tilted forward slightly so as to prevent the beam of light from being projected at too high an elevation above the road.

In Figs. 4 and 6 of the drawing are shown modifications of the lens illustrated in Fig. 1, Fig. 4 showing a modification in which an annular plane portion 10 is provided outside the ribbed portion of the lens to permit an additional part of the beam of light to be thrown directly ahead of the vehicle. In Figs. 6 and 7, instead of providing an annular plane portion 10 as shown in Figs. 4 and 5, a segmental portion 12 is provided at each side of the ribs.

It will be noted from an inspection of Figs. 2, 5 and 7, that the curvature is regular and continuous through the ribs 2 and the valleys 4, the line of contour of a transverse section through the lens constantly changing direction. The same is equally true of the lower ribs 6 and the shallower valleys 8. In the illustrated construction, the valleys and ribs are composed of true arcs of circuits intersecting tangentially.

It will be seen that the lens herein illustrated and described can very easily be molded and that the die for molding such a lens can readily be formed.

The lens produces a very satisfactory driving light and is believed to comply with all of the present regulations of all of the States of the Union which now have laws pertaining to light distribution from headlamps.

What I claim as new is:

1. A vehicle headlight lens for use with the usual parabolic reflector and lamp located substantially at the focus of the reflector, said lens having upon its opposed faces vertically arranged ribs and valleys, the ribs upon one face being opposed to those upon the other and the valleys correspondingly opposed, the cross sectional contour of the alternating ribs and valleys being substantially sinuous upon each face of the lens and the curvature of the intermediate group of ribs and valleys being less than that of the ribs and valleys to either side thereof.

2. A vehicle headlight lens for use with the usual parabolic reflector and lamp located substantially at the focus of the reflector, said lens being divided vertically into an intermediate light transmitting portion and lateral light diffusing portions, each of said portions having upon opposite faces thereof vertically arranged ribs of substantially uniform transverse contour throughout their lengths and valleys separating said ribs of substantially the same width as the ribs, the ribs upon opposite faces of the lens being opposed and the valleys correspondingly opposed, and the ribs of the intermediate light transmitting portion of the lens being shaped to diffuse the light less than the ribs of the lateral portions of the lens.

3. A vehicle headlight lens for use with the usual parabolic reflector and lamp located substantially at the focus of the reflector, said lens having upon its opposite faces vertically arranged ribs of substantially uniform cross section from top to bottom, the ribs and intermediate valleys of each lens face having a substantially sinuous contour in cross section, a group of the ribs in front of the lamp and intermediate between the two sides of the lens being of less curvature in cross section than the remaining ribs in order to permit a greater portion of light to pass directly through them, the ribs of this group upon the two faces of the lens being opposed.

Signed at Detroit, Michigan this 7th day of March 1922.

CLARENCE CARSON.

Witnesses:
IRENE DOLONER,
FLOYD A. UPTON.